Figure 1:
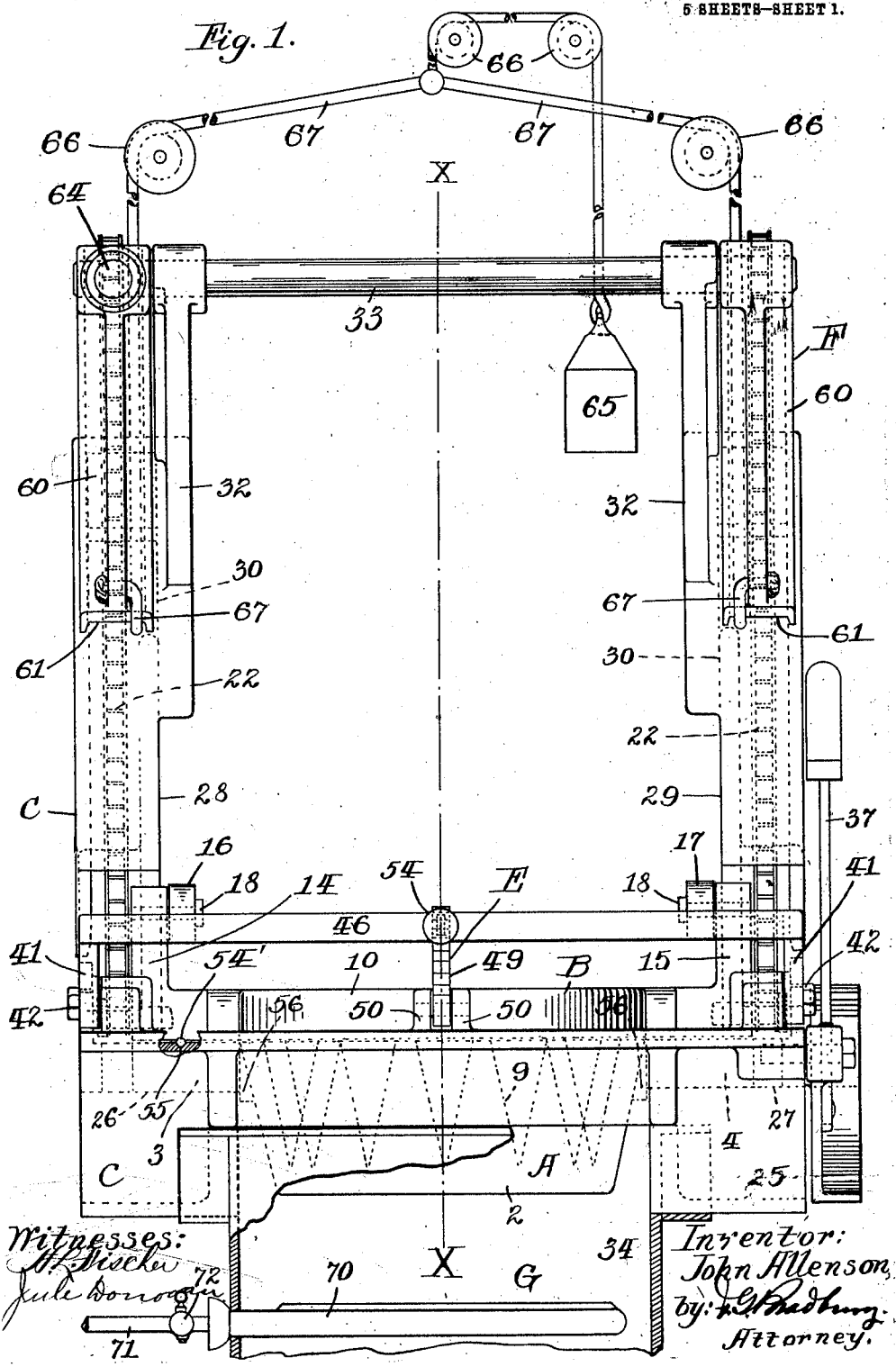

J. ALLENSON.
PASTRY BAKING MACHINE.
APPLICATION FILED JAN. 6, 1910.

987,032.

Patented Mar. 14, 1911.
5 SHEETS—SHEET 1.

Witnesses:
Inventor:
John Allenson
Attorney.

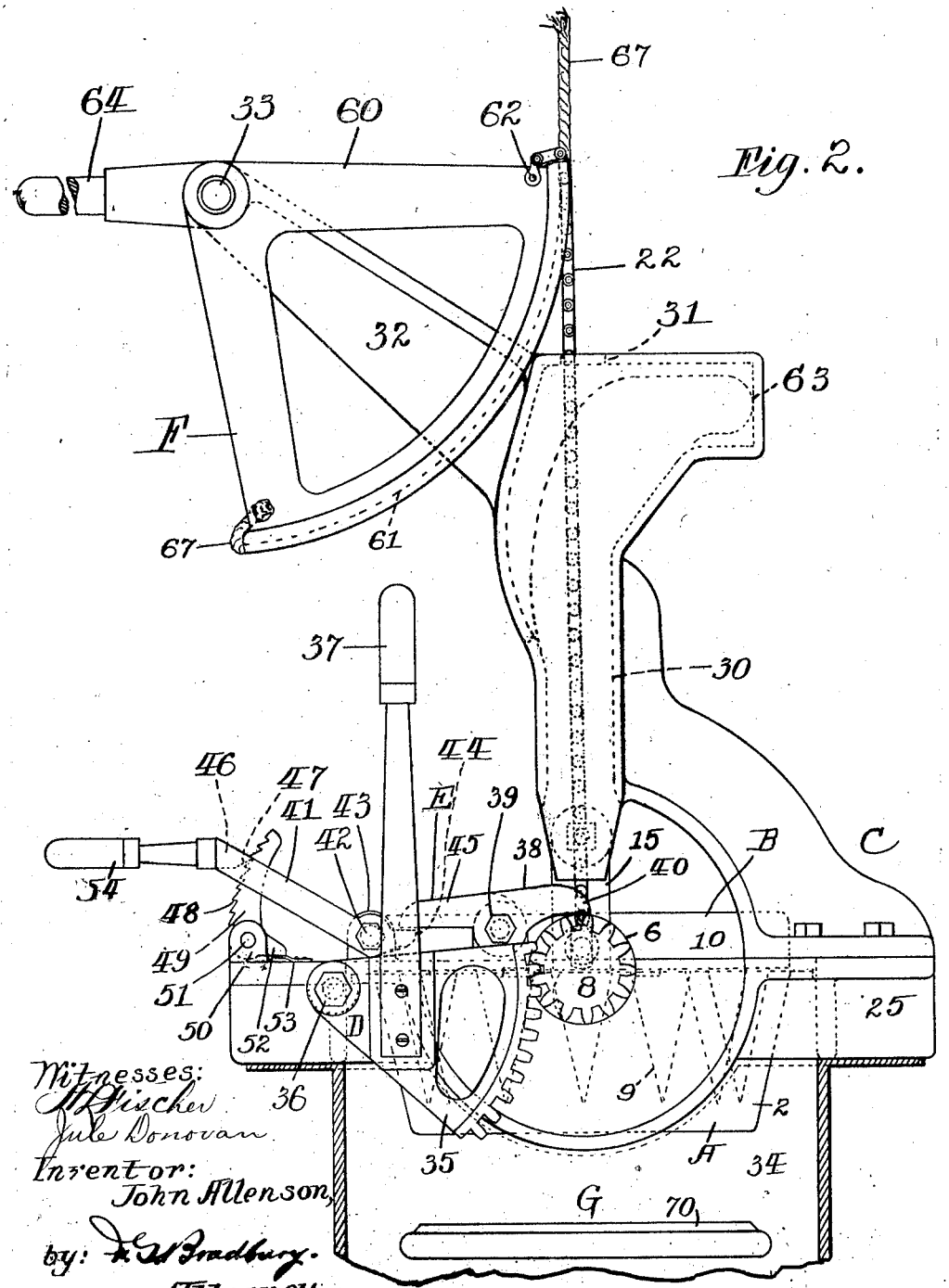

J. ALLENSON.
PASTRY BAKING MACHINE.
APPLICATION FILED JAN. 6, 1910.
987,032.
Patented Mar. 14, 1911.
5 SHEETS—SHEET 3.
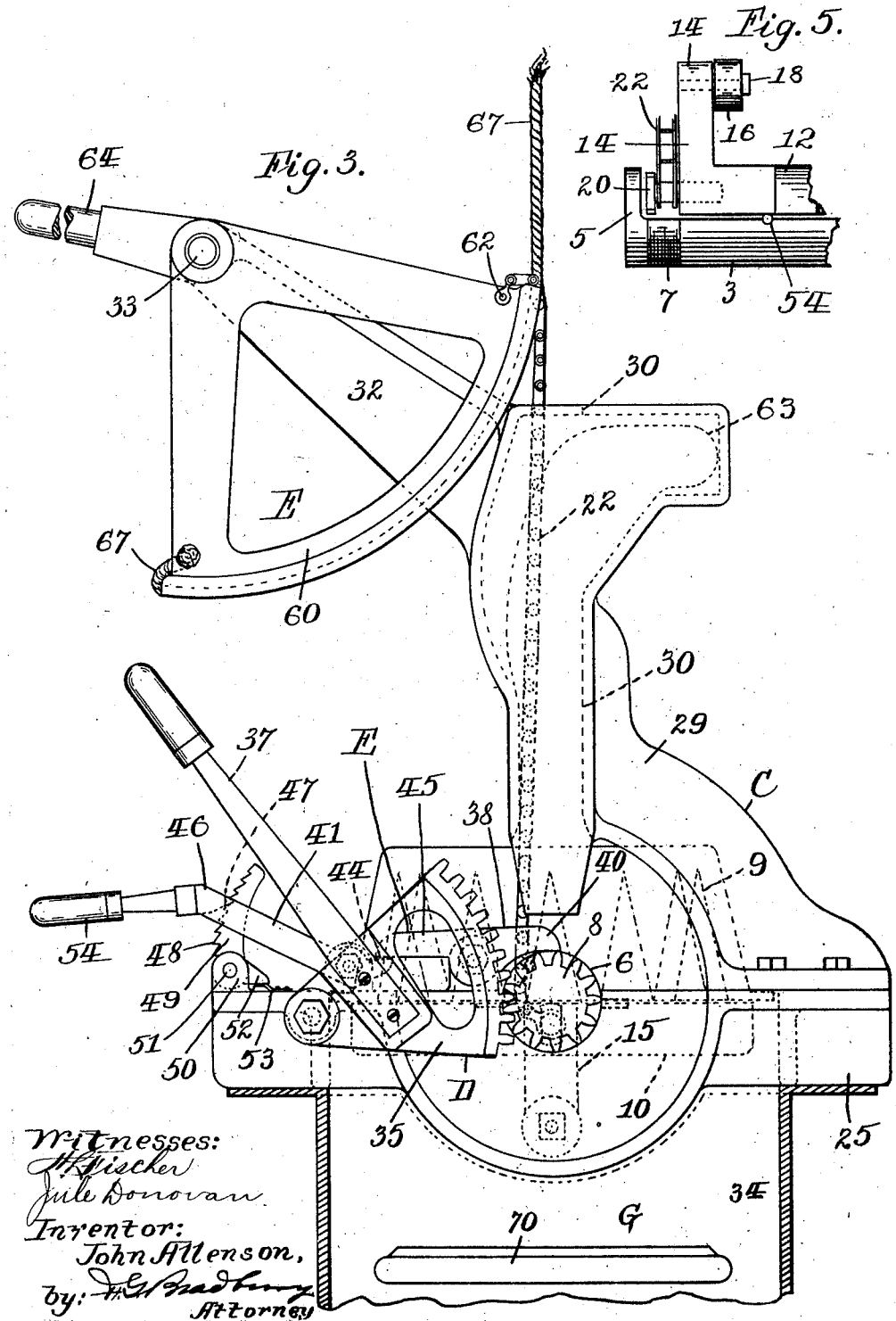

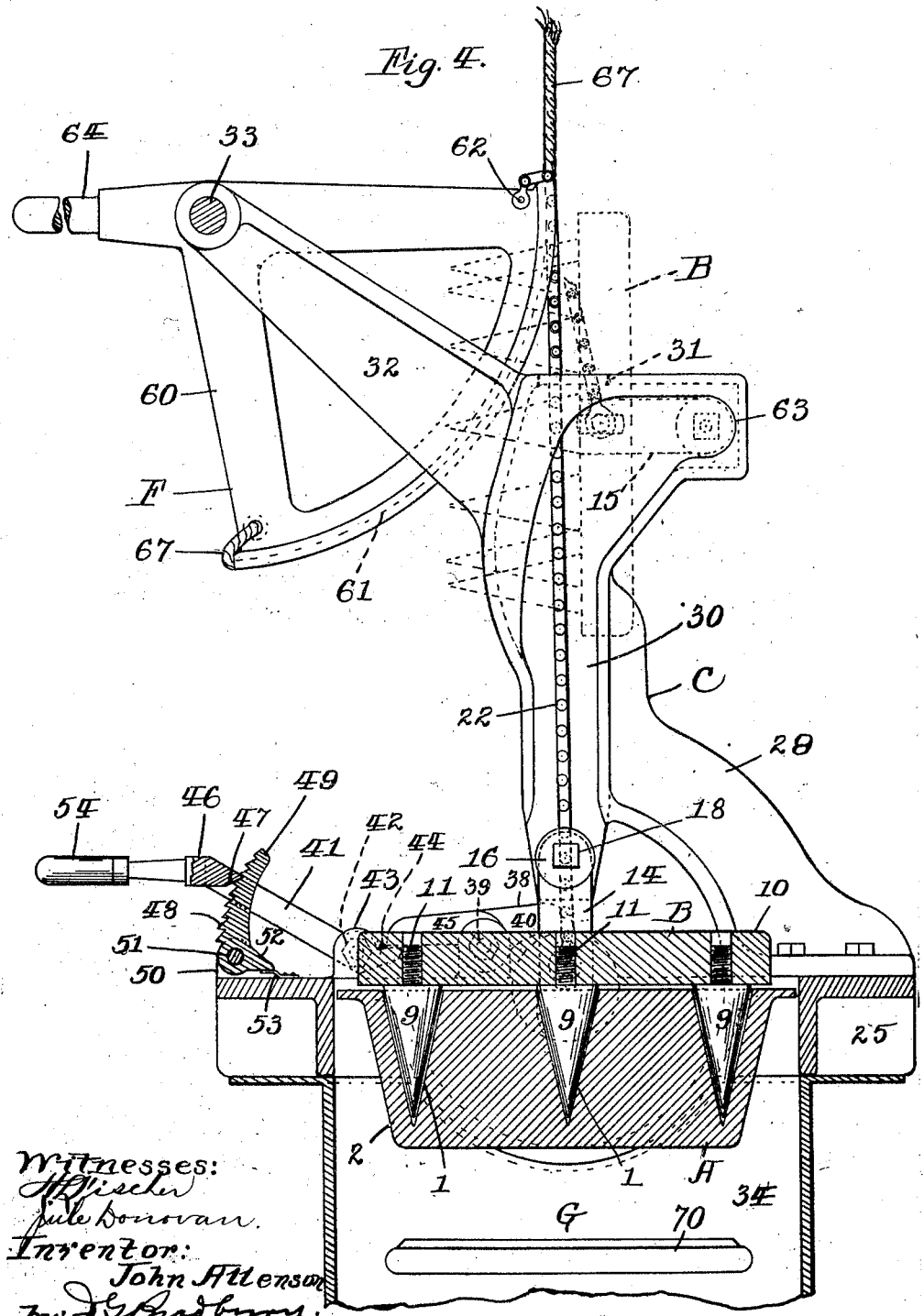

J. ALLENSON.
PASTRY BAKING MACHINE.
APPLICATION FILED JAN. 6, 1910.
987,032.
Patented Mar. 14, 1911.
5 SHEETS—SHEET 5.
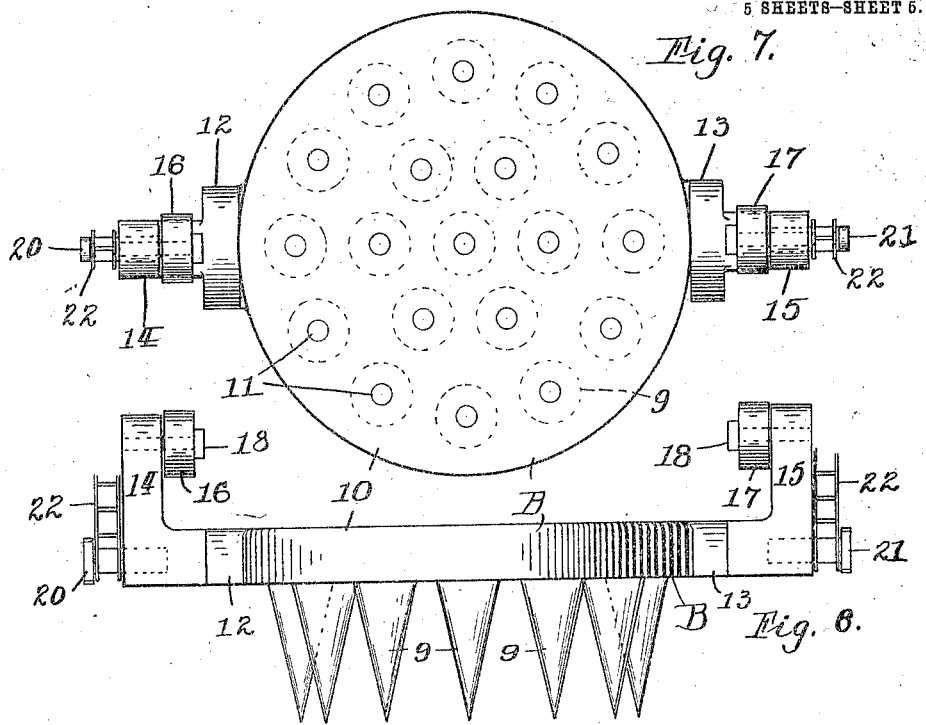
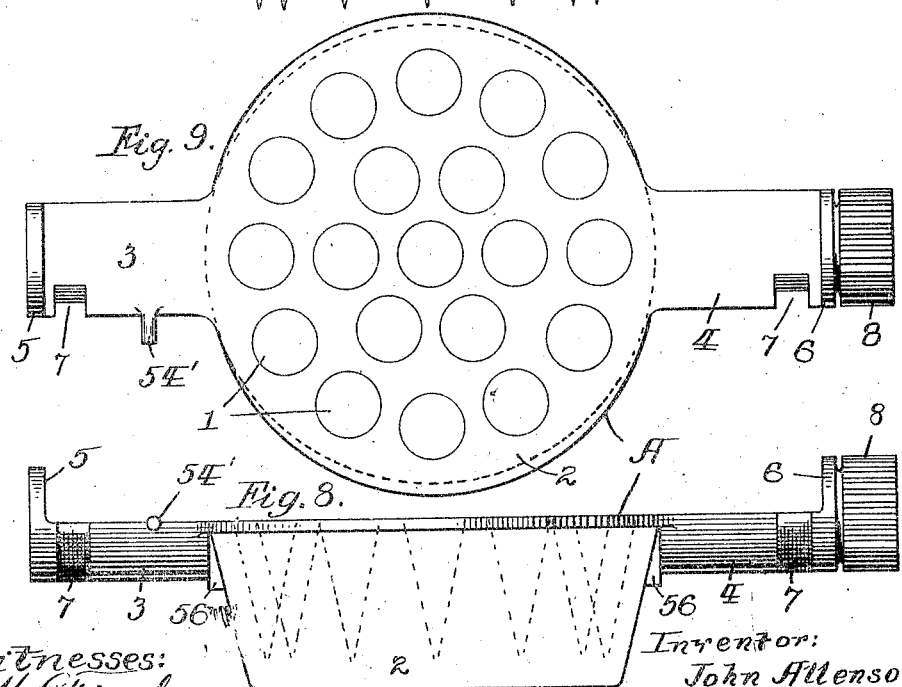
Witnesses:
H. L. Fischer
Jule Donovan
Inventor:
John Allenson,
by: H. L. Bradbury
Attorney.

UNITED STATES PATENT OFFICE.

JOHN ALLENSON, OF ST. PAUL, MINNESOTA.

PASTRY-BAKING MACHINE.

987,032.

Specification of Letters Patent. Patented Mar. 14, 1911.

Application filed January 6, 1910. Serial No. 536,713.

*To all whom it may concern:*

Be it known that I, JOHN ALLENSON, a citizen of the United States, residing at St. Paul, in the county of Ramsey and State of Minnesota, have invented a new and useful Improvement in Pastry-Baking Machines, of which the following is a specification.

My invention relates to improvements in molding machines and more particularly to that class which is designed for the convenient and expeditious production on a commercial scale of cones or cups which may be composed of pastry or other material for containing ice-cream and other food preparations or materials.

Among further objects of this invention is to introduce a machine which will mold and bake a plurality of cones or cups evenly, quickly and effectively and to provide an apparatus from which the cones can be easily and quickly removed after they have been baked.

In the accompanying drawings forming part of this specification Figure 1 is a front elevation of my invention parts thereof being broken away; Fig. 2 is a side elevation a portion of the heater being shown; Fig. 3 is another side elevation showing the mold elements in reversed position; Fig. 4 is a section of Fig. 1 taken on the line X—X the broken line position indicating the core element of the molding members in superior position; Fig. 5 is a view of a detail; Fig. 6 is a side elevation of the core mold element; Fig. 7 is a plan of the core molding element; Fig. 8 is a side elevation of the matrix element and Fig. 9 is a plan of said matrix element.

This invention comprises the following main parts: matrix and core molds A and B which coöperate together to mold and bake articles of manufacture such as pastry cups for holding ice-cream, a frame C on which said mold elements are journaled to be reversed with either the matrix or core elements on top, turning mechanism D for reversing the pair of mold elements, clamping mechanism E for holding the mold elements together during the molding and baking operation, an elevator F whose function is to raise the core mold element clear from the matrix and turn it so that the baked molded cups can be readily removed by the operator and the matrix refilled with batter ready to repeat an operation, and a heater G arranged to apply heat to the mold elements. These parts are so arranged that the matrix element can be filled or partly filled with batter while the core element is clear and remote therefrom, the core element can be lowered by the elevator into connection with the matrix and held in adjusted position with the batter filling the mold cavities by the clamping mechanism, and the mold elements while connected together can be reversed by the turning mechanism to expose the opposite sides of the mold to the heater to evenly and effectively bake pastry cups in the mold. An organization of elements of this character coöperating together is adapted to speedily cast a large number of evenly baked pastry cups which are uniform and crisp and permits of ease in operation by unskilled labor. These features are obviously a great advantage and reduce cost of production. Prior devices do not accomplish these results as efficiently and inexpensively as by this apparatus.

*Mold.*—The matrix mold comprises a shell 2 having a plurality of matrices or mold cavities 1 the walls of which are of substantially even thickness so as to evenly conduct heat to the inner wall of the mold cavity for baking the molded articles therein. On the ends of the matrix mold are two half round gudgeons 3 and 4 the extremities of which are formed with transverse disks or bearing wheels 5 and 6. The gudgeons 3 and 4 have transverse channels 7 and the bearing wheel 6 has upon its outside a pinion 8. The core member of the mold B is formed with a plurality of depending cores 9 which as illustrated are conical and adapted to be inserted in the mold cavities 1 to form the molds for the articles to be cast, said cores and walls of the matrices being slightly spaced apart to produce mold cavities. The body or head 10 of the core member has the cores attached thereto by threaded engagements 11 (see Fig. 4) and is formed with short half round gudgeons 12 and 13 which complete substantially round gudgeons when coacting with the corresponding members 3 and 4 of the matrix member. The outer ends of the gudgeons 12 and 13 are formed with angle extensions which produce guides 14 and 15 for the purposes to be hereinafter described. On the inner edges of these guides is a pair of anti-friction rollers 16 and 17 which are journaled upon bolts 18 secured in the guides.

On the outer edges of the guides near their angles are pivot bolts 20 and 21 by which the ends of chains 22 forming part of the elevator to be hereinafter described, are freely attached to the core member for raising the latter. The functions of the parts of the core and matrix members of the mold which have been described will be stated later.

*Frame.*—The frame comprises a bed 25 of suitable reinforced openwork construction having a pair of oppositely disposed journal bearings 26 and 27 in which the gudgeons on the matrix and core members of the mold are journaled. These bearings are open on top so that the core member of the mold can be lowered into place or elevated when desired and separated from the matrix. Secured upon the base is a pair of upright sides 28 and 29 each of which is formed with a guide groove 30 which is adapted to receive the guides 14 and 15 on the core member of a mold when it is raised. The guide grooves 30 after rising a considerable distance, turn into a horizontal position and are so shaped at their turns as to admit the guides and cause the core member to turn from a horizontal into a vertical position as illustrated by broken lines in Fig. 4.

The heads of the bolts 20 upon the core member have sufficiently broad surfaces to form a sliding contact with the inner surfaces of the guide grooves 30 and thus hold the core member longitudinally. The upper portions of the sides of the guide grooves in the sides 28 and 29 of the frame are open at 31 to admit the chains 22. Extending forwardly at upwardly inclined angles are two journal supporting arms 32 in the ends of which a transverse shaft 33 forming part of the elevator to be hereinafter described, is journaled. The lower portion of the bed is provided with a hood 34 in which is located a heater for the mold to be hereinafter described.

*Turning mechanism.*—The turning mechanism for reversing the mold consists of a toothed segment 35 which is pivoted upon a bolt 36 on one end of the bed of the frame and has teeth upon its perimeter which are adapted to mesh with the teeth of the pinion 8 on the end of the gudgeon 4 of the matrix member of the mold. This segment carries an upwardly extending handle 37 which when in vertical position causes the mold to assume a horizontal position as illustrated in Fig. 1 and when tilted back into the position illustrated in Fig. 3 to reverse the mold with the matrix member on top. In this manner either side of the mold can be exposed to the heater G below to evenly bake the molded cups in the mold cavities. A stop 54' on the matrix member of the mold is adapted to impinge against the surface of the bed of the frame in grooves 55 and serves to limit the movement of the mold when reversed in either direction and assists in holding the mold in horizontal position when so reversed.

*Clamping mechanism.*—The clamping mechanism for holding the mold elements together during the molding and baking operation and while being reversed, is also employed for assisting in holding the mold stationary in horizontal position when in either reversed position. This mechanism consists of a pair of dogs 38 one of which is placed on one side of the frame and the other on the opposite side to impinge upon the bearing wheels 5 and 6 on the ends of the gudgeons 3 and 4 of the matrix member of the mold. Each dog is pivotally mounted by a bolt 39 upon the bed in position so that its inner end 40 will press down upon one of the wheels 5 and 6. The dogs 38 are pressed into engagement with the wheels 5 and 6 on the matrix member of the mold by a pair of levers 41 each of which is pivotally mounted by a bolt 42 passing through lugs 43 on the bed with a short arm 44 pressing up against the outer extensions 45 of the dogs 38. The levers 41 are connected rigidly by a transverse bar 46 the inner edge of which midway between its ends is formed with a tooth 47 for engagement with teeth 48 on a ratchet bar 49 to hold the levers 41 stationary and the dogs 38 tightly held upon the wheels of the core member. In this manner the mold members are clamped together with the batter or other material to be molded or baked in the mold cavities when the matrix member is in uppermost position and at the same time the mold is free to be revolved by the segment 35 and reversed so as to expose either of its sides to the heater. The rack 49 is in the form of an upwardly extending tooth bar having its lower end pivoted in the lugs 50 on the bed by a pin 51 and has an inner extension or angle 52 which is pressed up by a spring 53 so as to throw the rack with its teeth into spring engagement with the tooth 47. A handle 54 is mounted upon the transverse support 46 so that the levers 41 can be manipulated by hand and the dogs adjusted upon the clamping wheels.

*Elevator.*—The elevator F, which is employed to raise the core mold element clear from the matrix and turn it into vertical position so that the baked molded cups can be freely removed by the operator and the matrix refilled with batter ready to repeat an operation, comprises a pair of segments 60 which are rigidly mounted upon the shaft 33. These segments have secured to the upper ends of their perimeters 61 the upper ends of the chains 22 which are attached thereto by means of bolts 62. When these segments are swung up by the shaft 33 the chains wrap upon their perimeters and raise the core member of the mold into superior position. As the core member rises in the guide grooves 30 in the sides of the frame, said grooves turn the guides 14 and 15 on the core member and cause the core member to assume a substantially vertical position upon reaching the end of travel. The extremities of the guides journal in the sockets 63 of the upper extremities of the guide grooves whereupon the chains 22 being connected to the body of the core member by the pivot bolts 20 and 21 (see Fig. 4) cause said core member to be drawn up into vertical position. A handle 64 mounted upon one of the segments 60 is employed for the purpose of turning said shaft and operating said elevator to raise or lower the core member of the mold. A counter balance weight 65 traveling over sheaves 66 illustrated diagrammatically in Fig. 1 is connected by a suitable bifurcated cable 67 with the lower ends of the perimeters of the segments 60, said weight acting to counter-act the weight of the core member and produce ease of operation of the elevator. The bifurcations of the cable wrap upon the perimeters of the segments 60 when the latter are turned.

*Heater.*—The heater G may be of any suitable construction or form. As illustrated it consists of a hydrocarbon burner 70 mounted within the hood 34 immediately below the mold. This burner is supplied with fuel from a suitable source not shown, through the supply pipe 71 which is regulated or shut off by means of a valve 72.

*Operation.*—In operation the matrix member is filled or partly filled with batter and the core member lowered by the elevator into the matrix member. The cores find their own seats in the batter in the matrices and produce molded cups of even thickness because the core element is freely disposed and of sufficient weight. After baking with the matrix member of the mold down clamping dogs 38 are adjusted over the perimeters of the wheels 5 and 6 and the levers 41 applied to the dogs. The mold is then reversed to the action of the heat by turning it with its core member down into the position illustrated in Fig. 3 by tilting the handle 37 forward. While in reversed position or while being reversed the dogs 38 serve to assist in holding the matrix member of the mold down in position on the core member. It will be noted that the pairs of gudgeons 3 and 12 and 4 and 13 turn respectively in the journals 26 and 27 while the dogs 38 are holding the matrix member down and that by the adhesion of the batter to the molding elements and the gudgeons 12 and 13 of the core members fitting in the journals, the core member is prevented from slipping out of place when the mold members are being reversed. After the mold is completely exposed to the heater as long as desired, it is returned to its original position. The elevator is finally operated by means of the handle 64 and the core member raised into superior position. The cups adhere to the cones or cores on the core member and project forward so that they can be easily and quickly removed by hand from the core member. Bosses 56 on the ends of the matrix mold adjacent the gudgeons thereon serve as stops to guide and hold the matrix mold longitudinally in the bed frame. The channels 7 in the gudgeons of the matrix mold serve to receive the chains of the elevator freely when the mold is reversed.

In accordance with the patent statutes I have described the principles of operation of my invention together with apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A molding machine of the class set forth, comprising, a heater, a pair of superimposed separable matrix and core members arranged to be heated by said heater, a frame upon which said members are journaled to turn and expose either side of said pair of members to said heater, and an elevator in said frame arranged to lift one of said members vertically while in horizontal position and means coöperating with said elevator for turning said core member into substantially vertical position after it is freed from the other member.

2. A molding machine of the class set forth, comprising, a pair of separable matrix and core mold members, a frame in which said members are journaled, one of said members being permitted to be raised clear of the other, an elevator for raising and turning one of said members from horizontal into vertical position above the other, means mounted on said frame independent of the mold members for holding said members in operative position on the frame, and means for heating said members from below and actuating mechanism for reversing said members so as to present opposite faces of said mold to said heating means.

3. A frame having a guide and journal, a mold having separable matrix and core members, one member being mounted in said journal and the other movable in said guide away from said first member from horizontal to vertical position, and a heater arranged to heat said mold, for the purposes specified.

4. A molding machine of the class set forth, comprising, a frame having a guide and journal, a mold having separable matrix and core members, one member being mounted in said journal and the other movable in said guide away from said first member from horizontal to substantially vertical position, means on said frame for holding one of said members in operative position, means for raising the other of said members in said guide, a counter balance for the member which is raised and a heater to which said mold is reversibly exposed to heat either of its opposite sides.

5. A molding machine of the class set forth, comprising a frame having a guide and journal, a mold having separable matrix and core members removably mounted in said journal one of its members being movable in said guide, a heater, said mold being reversibly mounted and adapted to present either of its opposite sides to said heater, means for turning said mold over to expose either of its opposite sides to said heater, and a carrier engaging one of said mold members and adapted to lift and turn the same in said guide into erect position clear of said matrix member with the apexes of its cones projecting forward.

6. A machine of the class set forth, comprising, in combination, a frame having a guide and journal, a mold having separable matrix and core members, one member being mounted in said journal and the other movable in said guide away from said first member from horizontal to vertical position, a heater arranged to heat said mold, and reversing mechanism for turning said mold with either of its opposite faces exposed to said heater.

In testimony whereof, I have signed my name to this specification, in the presence of two subscribing witnesses.

JOHN ALLENSON.

Witnesses:
H. L. FISCHER,
F. G. BRADBURY.